US009221224B2

(12) United States Patent
Rey et al.

(10) Patent No.: US 9,221,224 B2
(45) Date of Patent: Dec. 29, 2015

(54) INTEGRATED PROCESS TO GENERATE NEAR-ZERO THICKNESS SIPES IN A TIRE

(75) Inventors: Daniel Robert Rey, Greer, SC (US); Christian Albert Beccavin, Greenville, SC (US); Almira Aleckovic, Anderson, SC (US)

(73) Assignees: Compagnie Generale Des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 862 days.

(21) Appl. No.: 13/457,480

(22) Filed: Apr. 26, 2012

(65) Prior Publication Data

US 2013/0284332 A1    Oct. 31, 2013

(51) Int. Cl.
*B29D 30/68*       (2006.01)
*B60C 11/12*       (2006.01)
(Continued)

(52) U.S. Cl.
CPC .............. *B29D 30/58* (2013.01); *B29D 30/52* (2013.01); *B29D 30/68* (2013.01); *B60C 11/12* (2013.01);
(Continued)

(58) Field of Classification Search
CPC   B60C 11/12; B60C 11/24; B60C 2011/1277; B60C 2011/091; B60C 11/1204; B60C 11/1272; B60C 11/1209; B60C 11/14; B29D 30/00; B29D 2030/667; B29D 2030/605; B29D 30/58; B29D 30/60; B29D 30/685; B29D 30/52; B29D 30/68
USPC ............. 152/154.2, 209.1, 209.18, 210–212; 256/36.14, 501, 326, 328.3, 912, 256/DIG. 74
See application file for complete search history.

(56) References Cited

U.S. PATENT DOCUMENTS 1,455,361 A    5/1923   Sipe
6,874,552 B2   4/2005   Lopez
(Continued)

FOREIGN PATENT DOCUMENTS

FR    2763892 A1    12/1998
JP    2-246809 A    10/1990
(Continued)

OTHER PUBLICATIONS

JP 2-246809 A—English abstract obtained from Espacenet (http://worldwide.espacenet.com) on May 2, 2012, 2 pages.
(Continued)

*Primary Examiner* — Eric Hug
(74) *Attorney, Agent, or Firm* — Hahn Loeser & Parks, LLP; Bret A. Hrivnak

(57) ABSTRACT

The present invention comprises tire treads having sipes or other voids formed of non-curable inserts, as well as methods for forming sipes or other voids within a tread using non-curable inserts and apparatus for performing the same. Such methods include providing an uncured tread having a width and a thickness bounded by an outer side and a bottom side. Such methods further include providing a strip of non-curable material, the strip having a width and a length. Furthermore, such methods include inserting the strip of non-curable into the tread thickness from the tread outer side and to a predetermined depth within the tread thickness to form a void-forming insert within the tread thickness. Finally, these methods include curing the tread with the non-curable strip arranged within the tread thickness. The inserts may be folded, which may occur as the strips are inserted into the tread or prior to such insertion.

18 Claims, 6 Drawing Sheets

(51) Int. Cl.
*B60C 11/18* (2006.01)
*B29D 30/58* (2006.01)
*B29D 30/52* (2006.01)
*B60C 11/14* (2006.01)
*B29D 30/66* (2006.01)

(52) U.S. Cl.
CPC ........... *B60C 11/14* (2013.01); *B29D 2030/667* (2013.01); *B60C 2011/1277* (2013.04); *Y10T 156/12* (2015.01)

(56) References Cited

U.S. PATENT DOCUMENTS

| | | | |
|---|---|---|---|
| 7,208,110 | B2 | 4/2007 | Lopez et al. |
| 7,329,325 | B2 | 2/2008 | Prost |
| 7,468,153 | B2 | 12/2008 | Weydert et al. |
| 8,037,910 | B2 | 10/2011 | Watanabe |
| 2004/0089384 | A1* | 5/2004 | Lopez et al. ............... 152/154.2 |
| 2006/0042733 | A1* | 3/2006 | Matsui ....................... 152/152.1 |
| 2006/0151079 | A1* | 7/2006 | Weydert et al. ........... 152/209.18 |
| 2008/0216929 | A1 | 9/2008 | Mizutani |
| 2009/0178744 | A1 | 7/2009 | Nagai |
| 2013/0118660 | A1* | 5/2013 | Gay et al. .................. 152/209.1 |
| 2014/0318677 | A1* | 10/2014 | Kaneko et al. ........... 152/209.18 |

FOREIGN PATENT DOCUMENTS

| | | | |
|---|---|---|---|
| JP | 2000-94542 | * | 4/2000 |
| JP | 2001121926 | A | 5/2001 |
| JP | 4457735 | B2 | 4/2010 |
| KR | 10-1048783 | B1 | 7/2011 |

OTHER PUBLICATIONS

FR 2763892 A1—English abstract obtained from Espacenet (http://worldwide.espacenet.com) on May 2, 2012, 2 pages.
JP 2001121926 A—English abstract obtained from Espacenet (http://worldwide.espacenet.com) on May 2, 2012, 2 pages.
JP 4457735 B2—English abstract obtained from Espacenet (http://worldwide.espacenet.com) on May 2, 2012, 2 pages.
KR 10-1048783 B1—English abstract obtained from Google Translate (http://translate.google.com) on May 18, 2012, 1 page.

* cited by examiner

US 9,221,224 B2

INTEGRATED PROCESS TO GENERATE NEAR-ZERO THICKNESS SIPES IN A TIRE

BACKGROUND OF THE INVENTION

1. Field of the Invention

This invention relates generally formation of sipes in a tire tread, and more particularly, to forming near-zero thickness sipes in a tire tread.

2. Description of the Related Art

In tire tread designs, it is known to use sipes for the creation of edges for improved snow traction. To provide these benefits over the life of the tire, sipes substantially extend the full depth of the tread. Full depth sipes, however, may reduce the rigidity of the tread blocks into which sipes extend. A loss in tread block rigidity may affect tire performance, such as wear and braking performance.

Furthermore, sipes are presently molded into the tread using metallic members, which are at least 0.4 millimeters (mm) thick to withstand the forces that arise as the metallic members are removed from the tire tread during demolding operations. Because the corresponding sipes are also at least 0.4 mm thick, they may create more void than is desired.

Accordingly, to provide desired tire performance, it is desirable to provide a tread having sipes arranged through the depth of a tire tread that are not full depth sipes. Furthermore, it is also desirable to have sipes that are thinner than current sipes.

SUMMARY OF THE INVENTION

Embodiments of the present invention include methods and apparatus for forming a sipe or other void within a tire tread. Further embodiments of the invention include treads formed by such methods and apparatus.

Particular embodiments of the invention comprises a method of forming a sipe within a tire tread. Such methods include the step of providing an uncured tire tread having a width and a thickness bounded by an outer side and a bottom side. An additional step includes providing a strip of non-curable material, the strip having a width and a length. A further step includes inserting the strip of non-curable material into the tread thickness and to a predetermined depth within the tread thickness to form a void-forming insert within the tread thickness. A subsequent step comprises curing the tread with the non-curable strip arranged within the tread thickness.

Further embodiments of the invention comprise a tire tread. In particular embodiments, the tread comprises a thickness of tread material bounded by an outer side and a bottom side and a sipe including a strip of non-curable material arranged within the tread thickness, the strip of non-curable material having a width and a length and extending into the tread thickness by a distance equal to or less than the width of the strip.

Yet further embodiments of the invention comprise an apparatus for arranging non-curable inserts within a tire tread. Particular embodiments of such apparatus include a supply of non-curable material configured to translate along a path to a strip dispensing area along a support structure, the strip dispensing area including an aperture have a width less than a width of a strip formed from the supply of non-curable material. The apparatus further includes a cutting member arranged to cut a strip of a predetermined length from the supply of non-curable material. Yet further, the apparatus includes a plunger configured to actuate through the aperture and the support structure by a predetermined distance.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Particular embodiments of the invention provide a tire tread having sipes formed by non-curable inserts, while other embodiments comprise tires incorporating such treads. The non-curable inserts may form sipes that are thinner than traditional sipes, where the traditional sipes are formed by use of metallic molding elements projecting from the inner surface of the mold, which are removed from the tread subsequent the molding operation as part of the demolding operation. Furthermore, the inserts may be arranged within different layers of the tread to provide sipes which appear as the tire tread wears in lieu of using full depth sipes which may further reduce the stiffness of tread elements and affect the overall performance of the tire.

Figure 1:
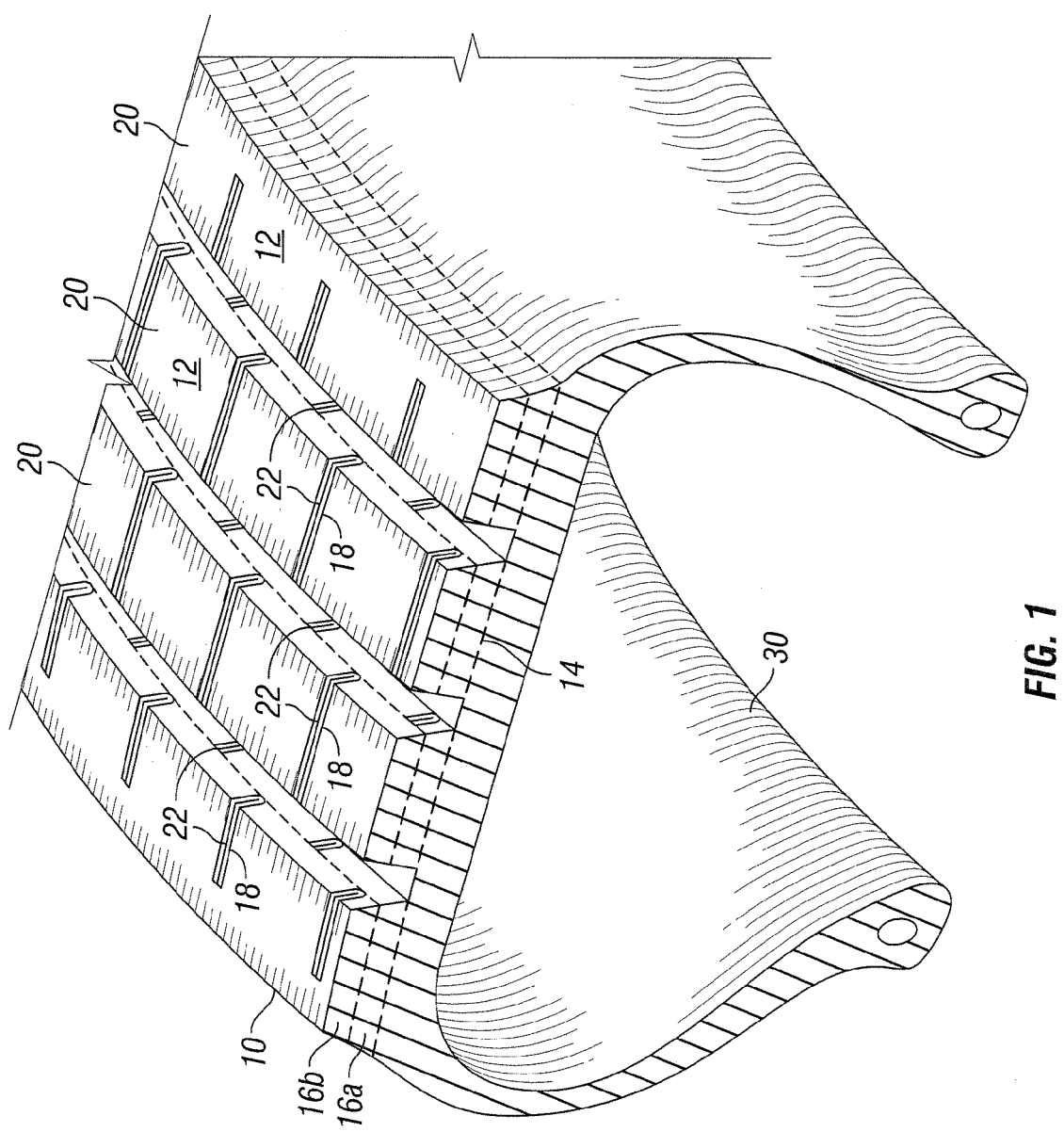
FIG. 1 is a perspective view of a tire having multiple layers of sipes formed by non-curable inserts according to an embodiment of the invention.
Figure 2:
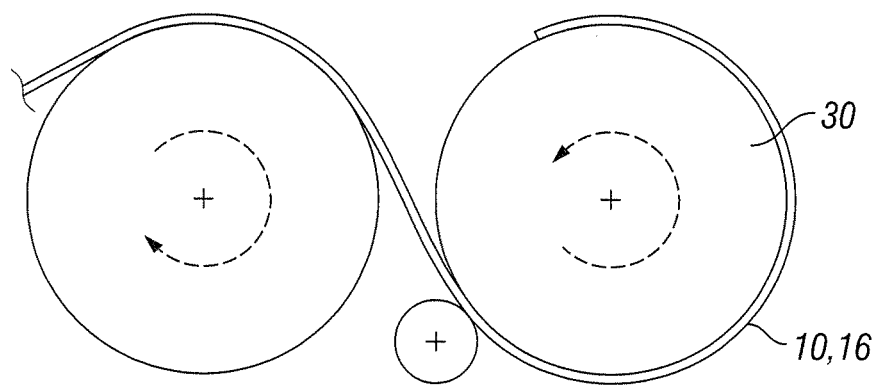
FIG. 2 is a side view of an uncured tire tread layer being wound upon a tire carcass according to a particular embodiment of the invention.

The inventive treads described herein include one or more inserts comprised of non-curable material, each of the inserts forming a sipe within the tread. The sipes may be formed within one or more layers within the tread thickness. With reference to FIG. 1, a tread 10 is shown according to an exemplary embodiment of the invention having two tread layers. The tread 10, shown attached to a tire 30, includes a first layer 16a and a second layer 16b of sipes 18 configured within a thickness of the tread. In particular, the embodiment shown provides sipes 18 arranged within tread elements or ribs 20, which are separated by tread longitudinal grooves (and/or lateral grooves in other variations). The thickness of tread material is bounded by an outer side 12 and a bottom side 14. The sipes 18 comprise thin slits within the tread formed using inserts 22.

Because the inserts are arranged within the tread while the tread is in an uncured state, the inserts remain within the tread as the tread is heated and cured—as well as after the tread has been demolded from any mold. Therefore, to prevent the inserts from substantially bonding to the tire tread as the tread is being cured, the inserts are formed of non-curable material. It is understood that the inserts may be formed entirely or partially of non-curable material. It is also understood that the inserts may be formed of any material having an outer layer of non-curable material, which may comprise a coating or laminate. Exemplary non-curable material includes cured plastic or rubber, paper, and metal. The non-curable material may be selected based upon particular properties to change the properties and behaviors of the insert during the tread forming process. Furthermore, the non-curable material may comprise a frangible or degradable material that fractures, breaks down into particles, or dissolves, such as during tire or tread demolding or during tire operation whereby the insert automatically discharges. A dissolvable non-curable material may be soluble in, or with, water or any other liquid.

With continued reference to FIG. 1, the inserts 22 comprise a folded strip of non-curable material, whereby the fold or folded side 24 of each insert is oriented downward into the tread thickness. In particular, the strip has a width and a length, whereby the width is folded to provide an insert of reduced width, such that the strip extends into the tread thickness by a distance less than the width of the strip. While the inserts are shown folded in half, where the fold is located halfway across a width of the sheet material, the inserts may be folded in any manner other than in half. For example, the width of the insert may be folded such that fold forms one side of the insert comprising one-third ($\frac{1}{3}^{rd}$) of the width and another side comprising two-thirds ($\frac{2}{3}^{rds}$) of the width.

As shown in FIG. 1, the inserts 22 extend lengthwise in a true lateral direction of the tread, that is, in direction across the tread width perpendicular to a longitudinal centerline of the tread, to form a like-oriented sipe 18, however, it is fully appreciated that any insert and corresponding sipe may extend lengthwise in any direction of the tread. Inserts 22 may form sipes 18 extending partially or fully across tread elements or ribs 20, each of which are provided in the example shown. Furthermore, each insert 22 and corresponding sipe 18 is shown to extend in a widthwise direction radially downward into the tread thickness. It is fully appreciated that any insert and corresponding sipe may extend downward into the tread thickness at any angle relative the tread outer side 12 or bottom side 14. It is also appreciated that any insert and corresponding sipe may have an angle relative to the plane surface of the tread. It is further appreciated that any insert and corresponding sipe may have any shape commonly associated with tire treads, such as curvilinear, zig-zag, sinusoidal, and the like.

Furthermore, each insert 22 is formed from a strip of non-curable material (see material 44 in FIGS. 3-6 for example), where the strip of material has a particular thickness. While the thickness of the material may be any desired thickness, when desiring to form a sipe of minimal thickness, the thickness of the material may be as thin as possible. For example, in particular embodiments, the thickness of the strip from which the insert is formed may be equal to or less than 0.03 millimeters (mm) (see $T_{44}$ in FIGS. 3-4 for example). Accordingly, in such embodiments, a folded insert and resulting sipe each have a thickness equal to or less than approximately 0.06 mm (that is, equal to twice the thickness of the strip to account for the fold). It is appreciated that because any sipe may extend as deep as desired, the width of each strip (see $W_{45}$ in FIG. 6) may be any desired width. For example, the strip width may be approximately 10 mm.

Such uncured treads may be formed prior to arrangement along a tire, or while arranged along a tire. In FIG. 1, for example, the tread 10 is shown arranged along the tire 30, however, the tread may be formed on a building surface, such as along a drum, flat plate, or the like, and the tread either molded and cured prior to attachment to a used tire carcass, such as during retreading operations, or the uncured tread may be removed from the building surface and arranged along a new tire carcass (that is, a green tire).

Further embodiments of the invention include methods of forming one or more sipes within a tire tread, which will now be discussed.

Particular embodiments of such methods include the step of providing an uncured tire tread having a width and a thickness bounded by an outer side and a bottom side. When forming sipes by inserting non-curable inserts into the tire tread prior to any molding and curing operation, it is beneficial that the tire tread is uncured, or at least the portion into which the inserts are to be placed. Not only is the uncured tread typically softer and more pliable than cured tread, which makes it easier to arrange the inserts within the tread thickness and risks less damage to the tire tread, the uncured tread is also better able to be assembled in layers, where such layers may each include the sipe-creating inserts. It is appreciated that the inserts may be inserted into the tread while the tread is in any desired arrangement. For example, the tread maybe arranged flat, such as along a flat or planar surface. As discussed above, the tire tread may be provided with a tire upon which the tread is arranged, or the tire tread may be independently provided separate from the tire for later application to the tire. In any event, the tire tread may be provided upon any desired building surface, such as any cylindrical or planar surface.

In any event, the uncured tread may be formed of one or more layers of uncured tread material. The tread, and any layer of tread, may be applied to the tire or building surface by any known means. For example, uncured tread material may be applied by extrusion, by applying a sheet of uncured tread material, or by applying a plurality of strips of uncured tread material to form the tread or a layer of tread. By further example, the methods and apparatus discussed in U.S. patent application Ser. No. 12/989,335, which has been published as US 2011/0036485 and is incorporated herein by reference, may also be employed to wind a tire tread or any layer thereof upon a tire or building surface, such as along a drum. Accordingly, particular embodiments of the step of providing an uncured tire tread includes winding a layer of uncured tread material upon a tire or tire carcass, where the tire carcass is either a used tire carcass for use in forming a retreaded tire, or a green tire carcass for use in forming a new tire. It is also appreciated that a tire tread may be formed by an extrusion process, and either wound on a building surface or arranged generally flat, such as along a generally flat static or conveying building surface.

Embodiments of such methods further include the step of providing a strip of non-curable material, the strip having a width and a length. The strip is provided to form an insert within a tire tread, whereby the insert forms a sipe or even a groove or other void within the tire tread. This strip of non-curable material may be formed entirely from a non-curable material, such as any pre-cured plastic, pre-cured rubber (synthetic or natural), paper, or metal or metallic material. Furthermore, the strip may be formed of any material, whether curable or non-curable, that is coated, lined, or laminated with any non-curable material for the purpose of preventing any substantial bonding or attachment of the insert to the tire tread during any subsequent curing operation. In particular embodiments, the non-curable material is a frangible or soluble material that disintegrates during tire operation.

In particular embodiments, the strip of non-curable material is flexible, such that the strip may be folded prior to or during insertion of the sheet into the tire tread to form the insert. By example, a width of the strip may be folded to form an insert having a width that is narrower than the width of the unfolded sheet. Additionally, or separately, the strip of non-curable material may be sufficiently thin to form an insert having a total thickness of approximately 0.06 mm or less, whether the insert is folded or unfolded. Accordingly, when the insert is folded once to achieve a total thickness of 0.06 mm or less, the strip has a thickness of approximately 0.03 mm or less. It is fully appreciated, however, that the strip may have any desired thickness to achieve a corresponding void within the tread, including any lateral or longitudinal groove or any sipe, whether the insert is folded or unfolded.

It is appreciated that the strip of non-curable material may be provided in any desired manner or form. For example, the strip may comprise a sheet or a film of non-curable material. Furthermore, strips may be supplied in pre-determined sizes to form predetermined sized inserts. Yet further, the sheet may be cut from a length of the non-curable material. In particular embodiments, a continuous length of non-curable material is supplied, such as from a supply spool or drum or directly from a sheet manufacturing device or process. Accordingly, in such instances, the step of providing includes supplying a length of non-curable material and cutting the strip from the length of non-curable material. It is fully appreciated that any means for cutting the insert from the length of non-curable material may be employed. For example, any mechanical cutting tool may be employed, including any translatory or rotary blade or knife, any shearing, stamping, or pressing apparatus, or any laser or water-jet cutting device. In particular embodiments, a solenoid or other means for actuating translates a rotary blade across a width of the non-curable material to form the strip. In particular variations, at least a portion of the length of non-curable material is secured, such as by being clamped, prior to cutting the strip from the length of material. This includes securing the strip of material to be cut from the length. Securement may be achieved by any method or means of securing or clamping. Furthermore, such method or means may continue to secure the strip after it is cut from the supply of non-curable material until the strip is inserted into the tread. For example, the strip may be released from securement before the strip is engaged for insertion into the tread, or may be forcefully removed from securement as the strip is being inserted into the tread.

Embodiments of such methods include the step of inserting the strip of non-curable into the tread thickness and to a predetermined depth within the tread thickness to form a void-forming insert within the tread thickness. Once the strip is provided, the strip is arranged overtop the tire tread in a desired location and arrangement. In doing so, the strip is arranged to extend lengthwise in any desired direction along the tread width and length. Once properly arranged, the insert is driven into the uncured tire tread by a driving device to a desired depth from any side of the tread, such as from the top tread side or bottom tread side (such as when, for example, the tread is inverted and arranged along a flat building support surface). For example, a plunger having a strip-engaging edge engages the strip and drives the strip into the tread thickness to the desired depth from an outer side or surface of the tread. In such instances, the edge of the plunger may be arranged relative the strip to cause the strip to fold about the plunger as the strip is driven into the tread. This may be achieved by arranging the plunger edge between the sides or ends of the strip defining the strip width or length, respectively, where the thickness of the plunger edge is less than the width or length of the strip, respectively. By doing to, at least a portion of the insert will fold about the plunger edge as the plunger extends into the tread thickness. Accordingly, the fold is driven downward—and furthest—into the tread thickness from an outer surface of the tread. In achieving a folded insert, it is appreciated that the length of the plunger edge may be equal to or greater than the length or width of the strip, which allows the fold to extend fully across the length or width of the strip. To achieve a thin sipe or void within the tread, the plunger may have a sufficiently thin thickness, however, because any size tread void is contemplated, the plunger may be of any desired thickness to achieve the tread void desired. It is appreciated that the insertion of the strips within the tread may be more easily achieved when the tread material is warm. Warm tread may be provided by warming the uncured tread material prior to insertion by a warming operation, or by virtue of using freshly made tread whereby the heat is supplied by the tread forming operation.

Once an insert is arranged within the tread, further inserts may be arranged within the tread. Prior to inserting a subsequent strip into the tread to form a subsequent insert, the subsequent strip is arranged relative the tire tread as desired to place an insert within the tread at a desired location. This arrangement may be achieved through relative translation and/or rotation between the tread and the subsequent strip for insertion. For example, when employing a strip-inserting apparatus, relative translation or rotation between the tread and the is achieved to position the insertion of a subsequent insert. Accordingly, such methods further include the step of positioning a subsequent strip of non-curable material at a new location along the tire tread, and repeating the step of inserting a strip of non-curable material into the tread thickness to provide a plurality of non-curable strips within the tread thickness before performing the step of curing.

Once a desired quantity of inserts are arranged within a thickness of the tire tread, one or more additional layers of tread may be arranged atop the existing tire tread. If it is desired to arrange inserts within each additional layer, the prior steps of the method are repeated to arrange one or more inserts within each desired tread layer. It is appreciated that each additional tread layer may be provided in any manner as the initial tread or tread layer was provided. Accordingly, particular embodiments of such methods may include the steps of arranging an additional layer of uncured tread material upon the outer side of the tread after the step of inserting the non-curable strip into the tread thickness and repeating the steps of providing a strip of non-curable material and inserting the non-curable strip into the tread thickness before the step of curing. It is understood that inserts may be placed into the tread in any desired arrangement within a single layer and relative inserts in other tread layers. For example, inserts in one tread layer may be staggered or offset in a lengthwise and/or lateral direction of the tread relative inserts arranged in another layer. By further example, inserts may be spaced depthwise through the tread thickness overtop one another. By arranging inserts in different layers, new sipes (or other tread voids) become exposed as the tread thickness wears over the life of the tread, which results in an evolving tread design. The evolving tread design may provide a continuous supply of sipes over the life of the tread without needing to extend any sipe the full tread thickness as may be required according to current sipe or void-forming techniques.

Figure 4:
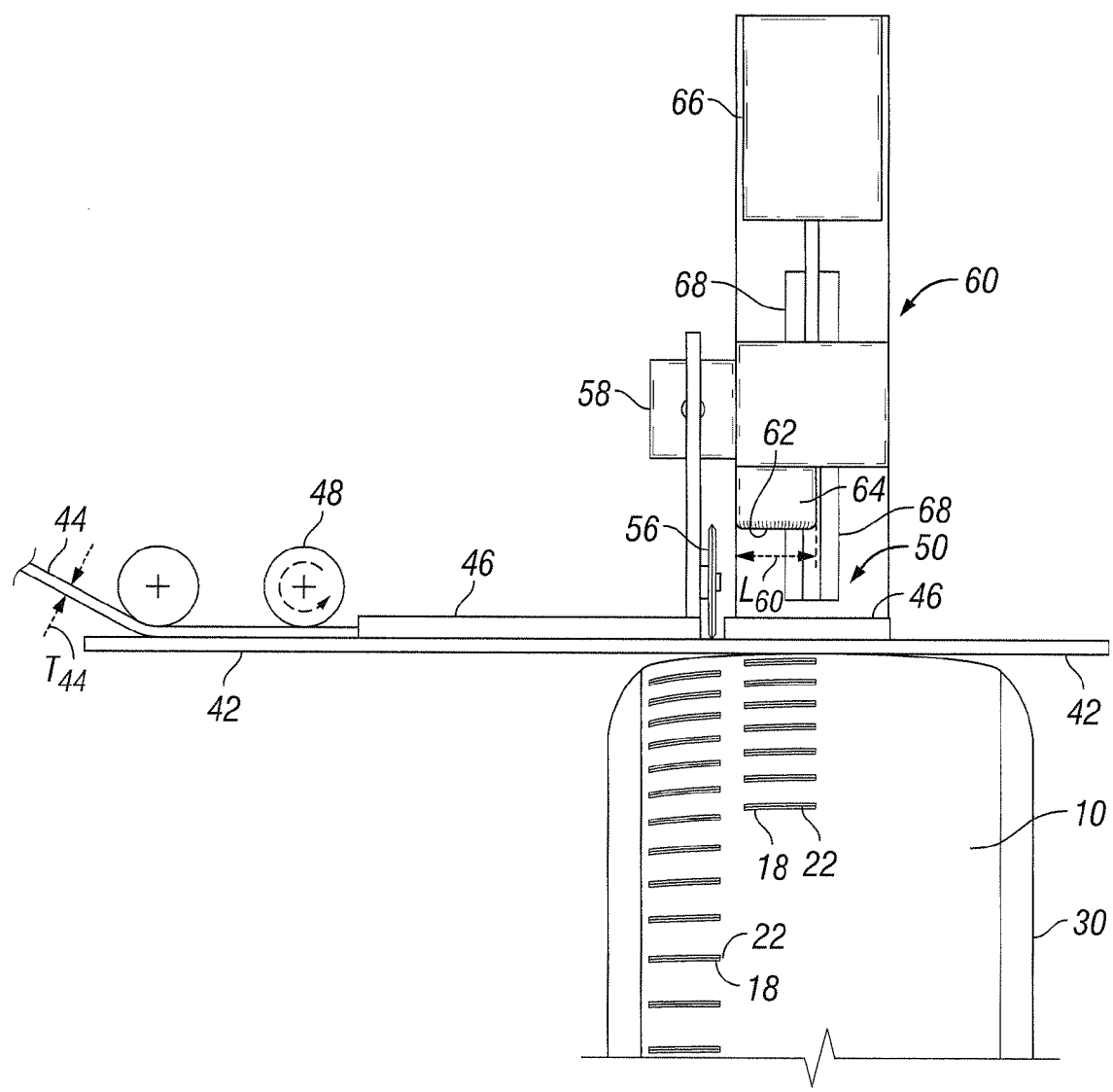
FIG. 4 is a front view of the apparatus shown in FIG. 3.

Particular embodiments of such methods include the step of curing the tread with the non-curable strip arranged within the tread thickness. Once the tread is formed and the desired quantity of inserts arranged therein, the tread is cured. This curing may be achieved concurrently with a molding operation, where the tread is further formed as desired to reflect a particular mold shape. This includes molding other features into the tread, such as longitudinal and/or lateral grooves. Accordingly, inserts may be arranged in the tread such that the inserts are arranged between grooves formed subsequently in the molding process or any other desired process in which grooves are formed. Grooves are shown in the embodiment shown in FIG. 1, which have been subsequently formed after arranging inserts within the uncured tread as generally shown in FIG. 4, by example. Curing of the tread may occur while the tread is arranged along a new or old tire carcass, or separate from any tire carcass to form a precured tread for retreading operations. After curing is completed and the tire is removed from any curing member, such as a mold, the insert may remain within the tire tread for tire operation. In lieu of removing the inserts during tread demolding operations, removal of the inserts may occur as the tire wears. For example, the inserts may wear, deteriorate, or otherwise discharge from the tire tread during tire operation.

Particular embodiments of such methods will now be described in further detail below in association with the figures filed herewith exemplifying the performance of the methods in association with particular embodiments of the tread.

With reference to FIGS. 2-7, an exemplary apparatus or system, such as a machine, is shown for arranging one or more inserts comprising non-curable material within a tire tread to form one or more corresponding sipes or tread voids.

As discussed above, a tire tread is provided for receiving one or more inserts. The tread may be provided in any desired manner. For example, with reference to FIG. 2, a system is shown for providing a tire tread 10, and more specifically, for applying one or more layers 16 of uncured tread material to a building surface 30, such as a tire carcass or a building drum. In the figure, uncured tread material is wound to form a tire tread 10 comprising one or more layers 16. In such system, the uncured tread material may be continuously supplied and cut upon completing the one or more layers 16. The uncured tread material may be supplied as a single width sheet that may extend laterally across a full width of the tread, or as one or more strips of uncured tread material having a width narrower than the full width of the tread and selectively arranged across a width of the tread to build a variable thickness tread, such as is shown in FIG. 1, to provide longitudinal grooves and tread elements or ribs 20. Such a system is disclosed in U.S. patent application Ser. No. 12/989,335, which has been published as US 2011/0036485 and incorporated herein by reference. In such system, the uncured tread material may be continuously supplied, and multiple strips of uncured tread material applied to the building surface concurrently. In other variations, for example, a single strip of uncured tread material may be wound multiple revolutions to form a layer of tread material, uncured tread material of predetermined length may be otherwise arranged along a building surface 30, or uncured tread material may be extruded or molded direction about the building surface.

Figure 3:
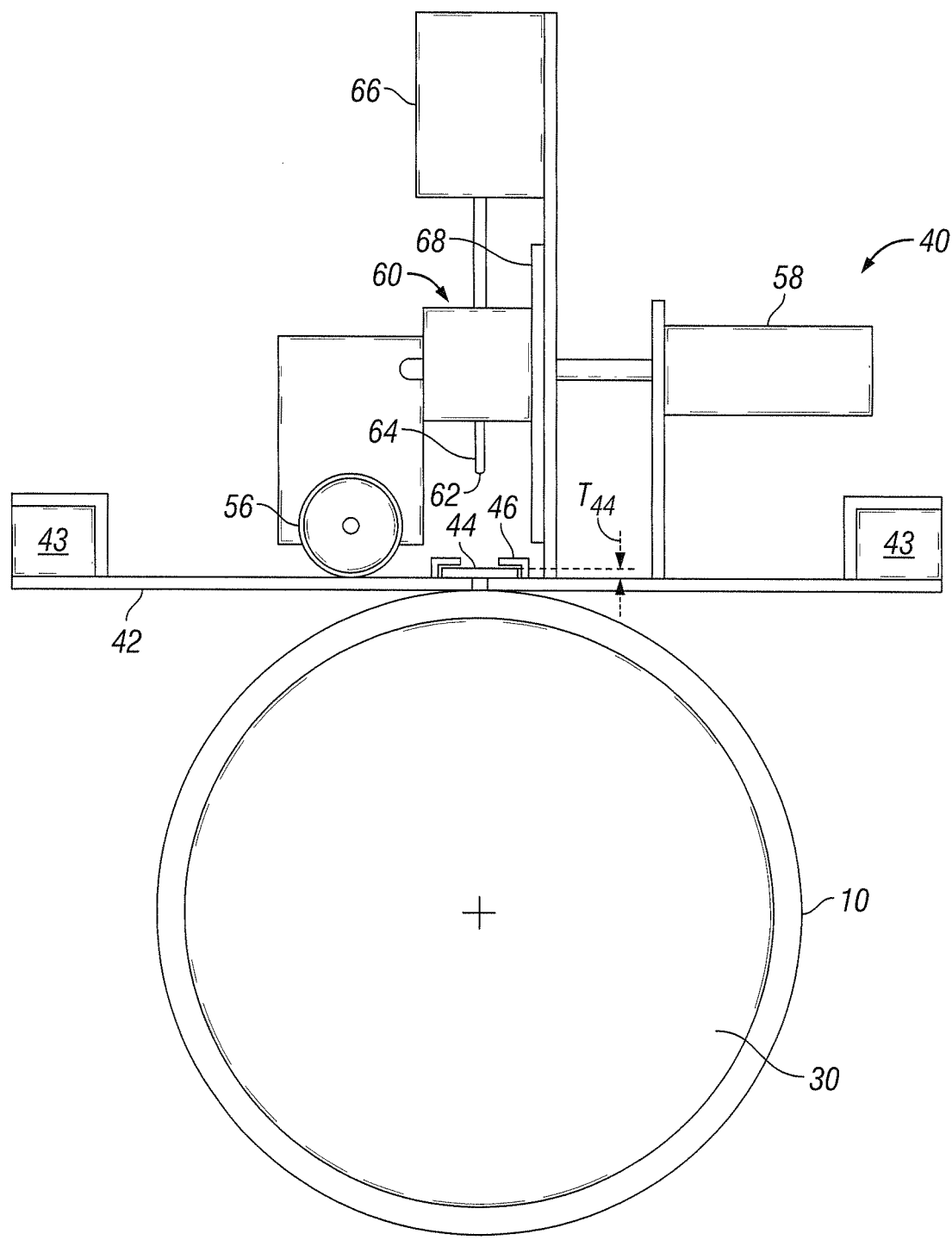
FIG. 3 is a side view of an apparatus for inserting non-curable inserts into a thickness of the uncured tire tread to form sipes or other voids in the tire tread according to an embodiment of the invention.
Figure 5:
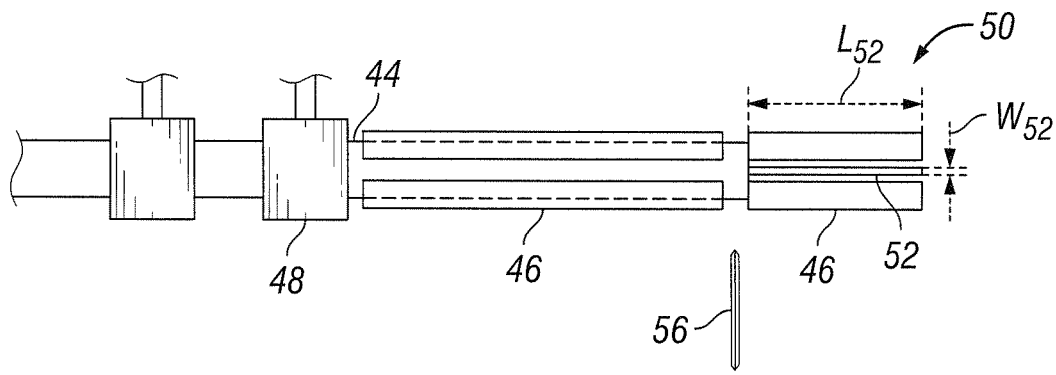
FIG. 5 is a top view of the apparatus shown in FIG. 3 showing a supply of non-curable material arranged within a track, the track extending from a supply end to a strip dispensing area according to an embodiment of the invention.

Once the requisite quantity of layers of tread material are wound about the building surface 30, one or more strips of non-curable material inserted into an outer, exposed surface of the tread. With reference to FIGS. 3-5, an exemplary apparatus 40 is shown capable of supplying and inserting the non-curable strips into the tire tread 10. In particular, a supply of non-curable material 44 is fed into the apparatus and constrained along a track 46. The supply of non-curable material 44 is constrained side-to-side by track 46, which directs the supply of material along a desired path to a strip dispensing area 50. In doing so, at least a portion of the supply of material extends underneath at least a portion of the track between opposing sides of the track. It is understood, however, that any means of directing the supply of non-curable material along a desired path may be employed, if at all.

Figure 6:
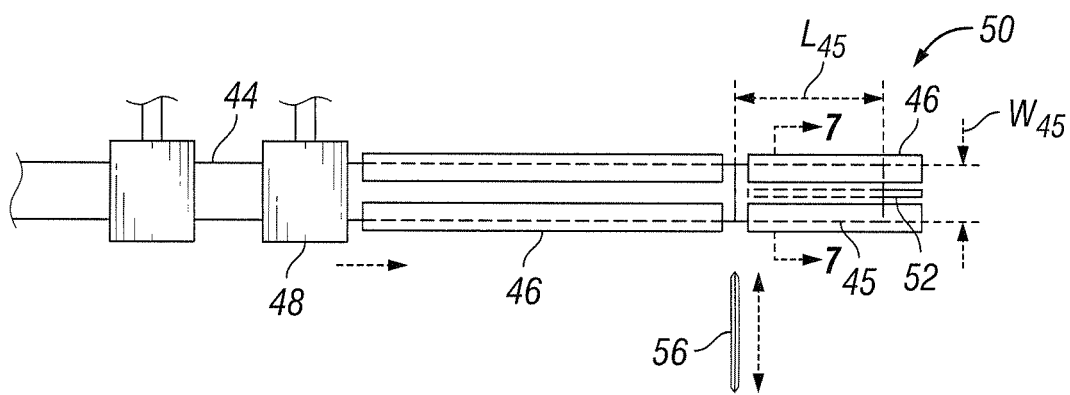
FIG. 6 is a top view of the apparatus shown in FIG. 5, showing the supply of non-curable material indexed into the dispensing area and a cutting member having cut the material to form a strip arranged within the dispensing area according to an embodiment of the invention.

Apparatus 40 further includes an indexer 48 to feed predetermined lengths of the non-curable material into the strip dispensing area 50 along support structure 42. In operation, indexer 48 rotates a predetermined amount to translate a corresponding length of the non-curable material a predetermined distance into the dispensing area 50. While a rotary indexer is shown, any other means for indexing a length of non-curable material known to one of ordinary skill in the art by any desired motion (such as rotation or translation) may be employed. With particular reference to FIG. 5, the supply of non-curable material 44 is shown awaiting indexing into the strip dispensing area 50. With reference now to FIG. 6, the indexer has translated a length of non-curable material into the dispensing area 50.

With reference to FIGS. 3-5, apparatus 40 further includes a cutting member, which is also referred to as a means for cutting a strip 45 of non-curable material from non-curable material supply 44. Once a length of the non-curable material is arranged within the dispensing area 50, such as shown in FIG. 6, a cutting member 56 cuts or separates the predetermined length of non-curable material indexed into the dispensing location from the supply of non-curable material 44. Upon separation, the predetermined length of non-curable material forms a strip 45 of non-curable material. In the embodiment shown, a rotary cutting member 56 is employed and actuated linearly by an actuating device 58. Actuating device 58 comprises a solenoid in the present embodiment, but may comprise any other device capable of moving (such as translating and/or rotating) the cutting member as needed to cut a strip from the supply of non-curable material. In other variations, a non-rotating cutting member may be employed, including those discussed above or any other member capable of cutting, lacerating, or separating a strip 45 of non-curable material from non-curable material supply 44. In the embodiment shown, cutting member 56 is rotatably attached to a support structure comprising a plate, but it is understood that cutting member may be directly attached to actuating device 58 or any other intermediate structure. It is also appreciated that strips 45 may be formed and provided by any other known method. For example, strips 45 may be previously cut, molded, or otherwise formed and subsequently fed to apparatus 40, such as along a backing tape or the like, and dispensed into dispensing area 50 from the backing tape. By further example, strips 45 may be supplied independently and fed separately into the dispensing area 50 by any manual or automatic method.

Figure 8A:
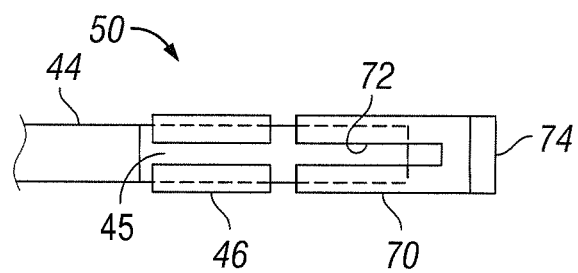
FIG. 8A is a top view of an insert dispensing area according to an alternative embodiment, whereby a clamp is provided to further secure the non-curable material prior to the formation of an insert and/or prior to the insertion of the insert into the tread.
Figure 8B:
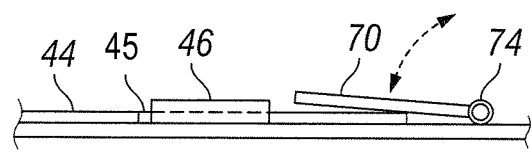
FIG. 8B is a side view of the dispensing area shown in FIG. 8A.

It is appreciated that at least a portion of the strips of non-curable material may be secured, such as by being clamped, prior to cutting the strip from the length of material. Securement may be achieved by any method or means of securing or clamping. For example, with reference to FIGS. 8A and 8B, the means for securing the strip 45 is a clamp 70. In operation, the clamp secures the strip 45 as it is being cut from the supply of non-curable material 44. Subsequent to formation of the strip 45, clamp 70 maintains securement of strip until plunger 60 forces strip from the clamp for insertion into the tread. In the embodiment shown, to facilitate this continued securement, a recess 72 is arranged within the clamp through which plunger 60 extends to insert strip into the tread. It is appreciated that clamp, however, may release the strip before plunger 60 engages strip 45. Clamp 70 may comprise any desired clamp. In the embodiment shown, clamp is rotated about hinge 74 to place clamp into an strip-securing arrangement, although it is appreciated that such movement of clamp may occur by rotation and/or translation. Any actuating member, such as a solenoid, may used to automatically or selectively secure strip. Manual methods may also be employed.

Figure 7:
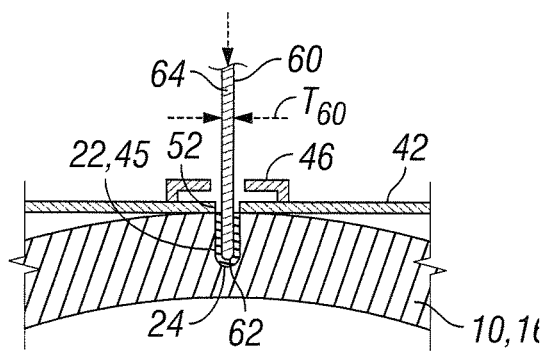
FIG. 7 is a side view of the apparatus shown in FIG. 3 showing a plunger extending through an aperture in the support structure of the apparatus to force the insert through the aperture an into the uncured tire tread according to an embodiment of the invention.

Upon arranging a strip of non-curable material within the dispensing location, a plunger is employed to drive the strip into a tire tread. With reference to FIG. 7, a plunger (or plunging device) 60 is shown driving the strip 45 of FIG. 6 into a tire tread 10 to a predetermined depth. Upon insertion, the strip 45 forms a non-curable insert 22 within the tire tread. The insert 22 in turn forms a sipe (or other void) 18 within the tire tread. To facilitate discharge of the strip from the dispensing area, an aperture 52 is arranged along the support structure 42 in the dispensing area 50 underneath the strip 45. The aperture 52 has a width $W_{52}$ that is narrower than the strip width $W_{45}$. In certain instances, the aperture width $W_{52}$ is approximately equal to, or slightly larger than, the sum of the plunger thickness $T_{60}$ and twice the thickness of the strip $T_{45}$- to account for any folding of the strip as it extends through the aperture 52. And because the aperture 52 is arranged between the opposing sides of the strip width $W_{45}$, the plunger 60 is able to engage the strip between the sides of the strip 45 and therefore force the strip through the aperture and into the tread 10. In particular instances, the plunger engages the strip centrally across the strip width $W_{45}$. Also, such an arrangement causes the strip 45 to fold about the plunger as the plunger extends through the aperture and into the tread to form a folded insert 22. Furthermore, the plunger 60 has a length $L_{60}$ equal to or less than the aperture length $L_{52}$ and typically equal to or greater than the strip length $L_{45}$. Likewise, aperture length $L_{52}$ typically has a length equal to or greater than the strip length $L_{45}$.

With particular attention to the plunger 60, said plunger includes a strip-engaging plunger edge 62 arranged at a free, terminal end of a thin, blade-like plunger body 64, whereby the fold 24 in insert 22 originates along the plunger edge 62 and wraps upward along both sides of the plunger body 64. The plunger 60 is also shown in FIGS. 3 and 4 arranged overtop the strip dispensing area 50. Plunger 60 is actuated linearly by an actuating member 66, which may comprise a solenoid, for example, or any other device capable of moving (such as translating and/or rotating) the plunger as needed to insert a strip of non-curable material into a tire tread. To control the actuation of the plunger 60, plunger is configured to translate along a track 68 (see FIG. 3) to constrain the movement of the plunger as it is actuated. Track 68 may comprise any structure within which, or along which, a portion of the plunger translates or rotates to sufficiently guide and/or constrain the movement of plunger during the insertion of inserts into the tread. In the embodiment shown, actuating member 66 and track 68 are attached to a support structure comprising a plate, but it is understood that each may be attached to any desired structure. To further control the actuation of plunger 60 and promote accurate insertion of the strip in the tread, the support structure 42 may be arranged atop the tire tread during the strip insertion process, whereby a portion of support structure contacts the tread.

As generally discussed above, once an insert has been arranged within the tire tread, additional inserts may be inserted in the same manner. Prior to inserting additional inserts, the tire tread and the insert-forming apparatus are repositioned relative each other so to insert any additional inserts at different locations along the tire tread. In doing so, the tire tread may rotate and/or translate relative the apparatus and/or the apparatus may move alone or additionally. For example, with reference to FIG. 3, support structure 42 is arranged along a pair of rails 43, such that the support structure 42 may translate relative the tire tread 10 for the purpose of arranging a new insert 22 at a predetermined location along the tread. In such instances, a manual or automatic mechanism for translating the support structure along rails 43 may be employed. For example, such a mechanism may comprise a linear drive, such as a screw drive. It is appreciated that any other known means for translating or moving apparatus 40 relative tire tread may be employed. It is also appreciated that multiple inserts may be concurrently inserted within the tread to increase processing time. For example, apparatus 40 may include multiple plungers to concurrently drive multiple strips into the tire tread. Furthermore, more than one apparatus 40 may operate along a single tire tread at different locations around the tire tread. Once a desired quantity of inserts are arranged within a tread layer, one or more additional tread layers may be added to the tread and one or more inserts arranged therein as described above. Once the uncured tread is completed, the tread is cured alone or while mounted upon a tire. The inserts may remain embedded in the tire tread after the tread has been demolded from any mold employed in the curing process.

The present invention may be utilized in association with any type of tire to form any new or retreaded tire and as such, any type of tire may provide an embodiment of the present invention. Exemplary tire types for use with the subject invention include heavy truck tires light truck tires, off the road tires, bus tires, aircraft tires, bicycle tires, motorcycle tires, and passenger vehicle tires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of forming a sipe within a tire tread, the method comprising the steps of:
providing an uncured tire tread having a width and a thickness bounded by an outer side and a bottom side;
providing a strip of non-curable material, the strip having a width and a length;
inserting the strip of non-curable material into the tread thickness and to a predetermined depth within the tread thickness and folding the strip of non-curable material to form a void-forming insert within the tread thickness; and,
curing the tread with the non-curable strip arranged within the tread thickness.

2. The method of claim 1, where the step of providing an uncured tire tread includes winding a layer of uncured tread material upon a tire carcass or a building surface.

3. The method of claim 2, where the layer of uncured tread material is formed from multiple strips of uncured tread material.

4. The method of claim 1, where the step of providing includes supplying a length of non-curable material and cutting the strip from the length of non-curable material.

5. The method of claim 1, where the step of inserting the strip of non-curable material into the tread thickness includes folding the strip of non-curable material as the strip is inserted.

6. The method of claim 1, where the strip of non-curable material is approximately 0.06 mm or less thick.

7. The method of claim 6, where the strip of non-curable material is approximately 0.03 mm or less thick.

8. The method of claim 1 further comprising the step of:
positioning a subsequent strip of non-curable material at a new location along the tire tread, and repeating the step of inserting a strip of non-curable material into the tread thickness to provide a plurality of non-curable strips within the tread thickness before performing the step of curing.

9. The method of claim 1 further comprising the steps of:
arranging an additional layer of uncured tread material upon the outer side of the tread after the step of inserting the non-curable strip into the tread thickness; and,
repeating the steps of providing a strip of non-curable material and inserting the non-curable strip into the tread thickness before the step of curing to form inserts within the new tread layer.

10. A tire tread comprising:
a thickness of tread material bounded by an outer side and a bottom side;
a sipe including a strip of folded, non-curable material arranged within the tread thickness, the strip of non-curable material having a width and a length and extending into the tread thickness by a distance equal to or less than the width of the strip.

11. The tire tread of claim 10, where the tire tread includes a plurality of strips of non-curable material arranged within the tread thickness.

12. The tire tread of claim 11, where the tire tread thickness comprises multiple layers of tread material, the plurality of strips being arranged within each of the multiple layers of tread material.

13. The tire tread of claim 10, where the strip is folded to form a folded insert.

14. The tire tread of claim 13, where the folded side of the insert is the deepest portion of the insert arranged within the tread thickness.

15. The tire tread of claim 10, where the tread is arranged along a tire carcass.

16. A method of forming a sipe within a tire tread, the method comprising the steps of:
providing an uncured tire tread having a width and a thickness bounded by an outer side and a bottom side;
providing a strip of non-curable material, the strip having a width and a length;
inserting the strip of non-curable material into the tread thickness and to a predetermined depth within the tread thickness to form a void-forming insert within the tread thickness;
curing the tread with the non-curable strip arranged within the tread thickness;
arranging an additional layer of uncured tread material upon the outer side of the tread after the step of inserting the non-curable strip into the tread thickness; and,
repeating the steps of providing a strip of non-curable material and inserting the non-curable strip into the tread thickness before the step of curing to form inserts within the new tread layer.

17. A method of forming a sipe within a tire tread, the method comprising the steps of:
providing an uncured tire tread having a width and a thickness bounded by an outer side and a bottom side;
providing a strip of non-curable material, the strip having a width and a length, where the strip of non-curable material is approximately 0.06 mm or less thick;
inserting the strip of non-curable material into the tread thickness and to a predetermined depth within the tread thickness to form a void-forming insert within the tread thickness; and,
curing the tread with the non-curable strip arranged within the tread thickness.

18. The method of claim 17, where the strip of non-curable material is approximately 0.03 mm or less thick.

* * * * *